United States Patent
Peng

(10) Patent No.: US 8,063,993 B2
(45) Date of Patent: Nov. 22, 2011

(54) IMAGE NOISE MEASUREMENT SYSTEM AND METHOD

(75) Inventor: Yuan-Chih Peng, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 876 days.

(21) Appl. No.: 12/149,191

(22) Filed: Apr. 29, 2008

(65) Prior Publication Data

US 2009/0021644 A1     Jan. 22, 2009

(30) Foreign Application Priority Data

Jul. 18, 2007   (TW) ................................ 96126169 A

(51) Int. Cl.
*H04N 5/00* (2006.01)
*H04N 5/14* (2006.01)
*G06K 9/40* (2006.01)

(52) U.S. Cl. .................... 348/607; 348/701; 382/275

(58) Field of Classification Search .................. None
See application file for complete search history.

(56) References Cited

U.S. PATENT DOCUMENTS

| | | | |
|---|---|---|---|
| 4,242,705 A * | 12/1980 | Ebihara ........................ | 348/620 |
| 5,561,532 A * | 10/1996 | Ohnishi et al. ................ | 386/264 |
| 5,657,401 A | 8/1997 | De Haan et al. | |
| 5,844,627 A | 12/1998 | May et al. | |
| 6,259,489 B1 | 7/2001 | Flannaghan et al. | |
| 6,307,888 B1 | 10/2001 | Le Clerc | |
| 7,474,800 B2 * | 1/2009 | Moskvitin ...................... | 382/275 |
| 7,548,277 B2 * | 6/2009 | Babonneau et al. ........... | 348/607 |
| 2006/0221252 A1 | 10/2006 | Zhou et al. | |
| 2007/0070250 A1 * | 3/2007 | Zhou et al. .................... | 348/607 |

* cited by examiner

*Primary Examiner* — Brian Pendleton
*Assistant Examiner* — Jason Lin
(74) *Attorney, Agent, or Firm* — Bacon & Thomas, PLLC

(57) ABSTRACT

An image noise measurement system performs a noise estimation on a current image. A storage device stores a previous image. A noise estimator performs a noise estimation on sub-areas of the current image and the previous image to thereby produce a noise estimation index for the sub-area of the current image. A distribution calculator calculates a distribution of positive and negative signs of pixel differences in the sub-areas of the current image and the previous image to thereby output a positive sign number and a negative sign number. A confidence generator produces a confident level index according to the positive sign number and the negative sign number. A recursive filter performs a recursive filtering operation on the noise estimation index according to the confident level index to thereby produce a noise estimate for the current image.

10 Claims, 3 Drawing Sheets

IMAGE NOISE MEASUREMENT SYSTEM AND METHOD

BACKGROUND OF THE INVENTION

1. Field of the Invention

The present invention relates to a method of image processing and, more particularly, to a system of an image noise measurement and the method thereof.

2. Description of Related Art

Generally, TV signals are likely to suffer from the interference in transmission to thus have noises. To reduce the interference of the noises, a noise reduction is typically provided in a display section. However, the noise reduction in either spatial or temporal domain possibly produces various problems. Typically, the noise reduction is performed by first analyzing the noise levels of input images and then taking various noise reduction processes according to the noise levels analyzed.

U.S. Pat. No. 5,844,627 granted to May, et al. for a "Structure and method for reducing spatial noise" describes a method for spatial noise reduction, which first analyzes the spatial frequency components and then suppresses the possible bands with noises. However, the method for spatial noise reduction cannot completely separate the noises from the video components in space, and thus the side effect of blurs easily present in the video. U.S. Pat. No. 6,259,489 granted to Flannaghan, et al. for a "Video noise reducer" describes a method for temporal noise reduction, where the pixels of a still picture at different time on a same spatial position are taken a mean along a temporal axis if the noises are uncorrelated in the temporal axis and have a mean of zero. Accordingly, the reduced noise variance and the video with a lower noise level are achieved. However, the temporal noise reduction, which obtains the reduced noises without losing the spatial definition on the still picture, has to operate with detection of motion object occurred in the video to thereby avoid averaging the samples at different spatial positions and producing a motion blur or residual.

Generally, a viewer shows high tolerance in the side-effects caused by the noise reduction when the noise is at a high level, but the viewer shows relatively low tolerance in the side-effects when the noise is at a low level. Since the unacceptable detects are produced when a strong noise reduction and filtering method is applied to a low-noise video signal or the insufficient noise reduction on a high-noise video signal presents when a weak noise reduction and filtering method is applied, an accurate noise level measurement is required for an input video signal. Namely, an appropriate noise reduction and filtering strength is required for a good noise processing.

In order to accurately measure the noise level in the input video signal, U.S. Pat. No. 5,657,401 granted to Choi for a "Method for driving a matrix liquid crystal display panel with reduced cross-talk and improved brightness ratio" compares the sum of temporal absolute differences with a set of thresholds. When the sum locates in the upper and lower boundaries of the set, an accumulator is increased by one, and subsequently it is determined whether a total number of pixels in a predetermined interval is equal to an expected value. When the total number of pixels in the predetermined interval does not equal to the expected value, the set of thresholds is adjusted to thereby respond the noise level in the video signal. However, a picture contains the different proportions of motion areas, and accordingly the expected value cannot be predetermined easily and the noise level measurement can be easily affected by the number of pixels corresponding to the motion areas in the frame.

To overcome the aforementioned problem, U.S. Pat. No. 6,307,888 granted to Le Clerc for a "Method for estimating the noise level in a video sequence" uses the measured motion information to divide a signal into still and motion blocks. The still and the motion blocks are operated (such as calculating the sum of temporal absolute differences) with corresponding positions (still) and corresponding motion compensation blocks (motion) to find the noise estimates of the still and the motion blocks respectively, and subsequently the noise estimates of the still and the motion blocks are mixed to thereby obtain a final noise estimate. Such a manner requires an accurate motion estimation to thus measure the accurate noise levels in the motion blocks. However, a typical TV display system does not contain a motion estimation and compensation operation.

US Patent Publication No. 2006/0221252 for a "Reliability estimation of temporal noise estimation" converts a distribution of the temporal local difference into a characteristics value and compares the characteristics value to a threshold corresponding to an ideal distribution to accordingly determine to remain or discard the noise level of the current frame. The different motion degrees generally affect the distribution of the temporal local difference. However, the number of motion pixels present in the video signal is different, and the difference of motion time produced in the video signal is different. Accordingly, the distribution of the temporal local difference is gradually changed with the different motions, which increases the difficulty of finally determining to remain or discard the threshold.

Therefore, it is desirable to provide an improved image noise measurement system and method to mitigate and/or obviate the aforementioned problems.

SUMMARY OF THE INVENTION

An object of the present invention is to provide an image noise measurement system and method, which eliminates the noise estimates with great differences and avoids the measured noise level being affected by a motion interference, thereby obtaining a reliable noise estimate.

Another object of the present invention is to provide an image noise measurement system and method, which can find the noise level in a time interval without setting the threshold.

In accordance with one aspect of the invention, an image noise measurement system is provided, which performs a noise estimation on an image. The system includes a storage device, a noise estimator, a distribution calculator, a confidence generator and a recursive filter. The storage device stores a previous image immediately prior to the image. The noise estimator is connected to the storage device in order to perform a noise estimation on sub-areas of the image and the previous image and to produce a noise estimation index for the sub-area of the image. The distribution calculator is connected to the noise estimator in order to calculate a distribution of positive and negative signs of pixel differences in the sub-areas of the image and the previous image that are covered by the noise estimator and to output a positive sign number and a negative sign number. The confidence generator is connected to the distribution calculator in order to produce a confident level index according to the positive sign number and the negative sign number. The recursive filter is connected to the noise estimator and the confidence generator in order to perform a recursive filtering operation on the noise estimation index according to the confident level index and to produce a noise estimate for the image.

In accordance with another aspect of the invention, an image noise measurement method is provided, which performs a noise estimation on an image. The method includes: a storing step, which stores a previous image immediately prior to the image; a noise estimating step, which performs a noise estimation on sub-areas of the image and the previous image and produces a noise estimation index for the sub-area of the image; a distribution calculating step, which calculates a distribution of positive and negative signs of pixel differences in the sub-areas of the image and the previous image and outputs a positive sign number and a negative sign number; a confidence generating step, which produces a confident level index according to the positive sign number and the negative sign number; and a recursive filtering step, which performs a recursive filtering operation on the noise estimation index according to the confident level index and produces a noise estimate for the image.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
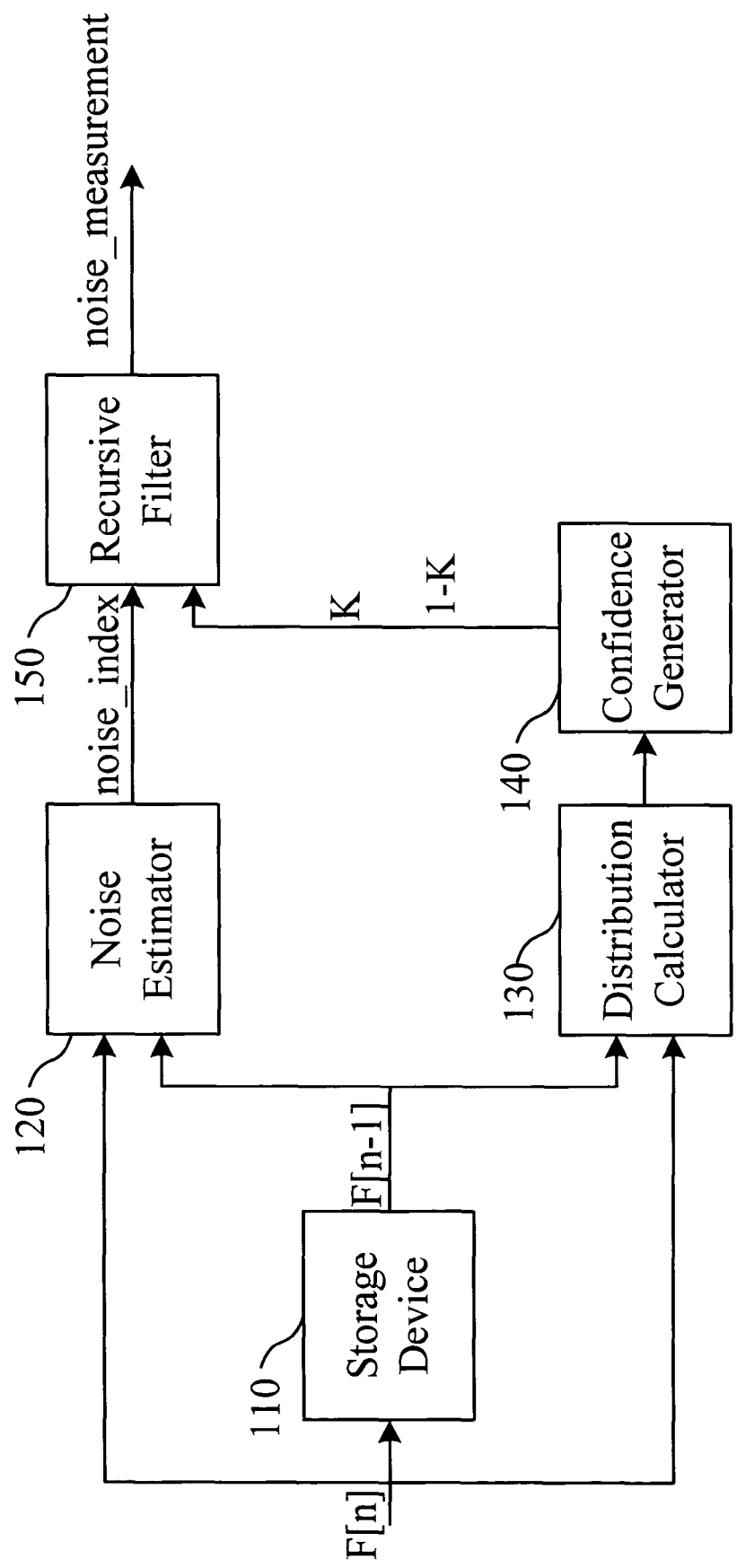
FIG. 1 is a block diagram of an image noise measurement system according to the invention.

FIG. 1 is a block diagram of an image noise measurement system according to the invention. The system performs a noise estimation on an image F[n] to thereby produce a noise estimate for the image F[n]. The system includes a storage device 110, a noise estimator 120, a distribution calculator 130, a confidence generator 140 and a recursive filter 150.

The storage device 110 stores a previous image F[n−1]. The noise estimator 120 is connected to the storage device 110 in order to perform a noise estimation on sub-areas of the image F[n] and the previous image F[n−1] and to produce a noise estimation index noise_index corresponding to the sub-area of the image F[n].

The distribution calculator 130 is connected to the noise estimator 120 in order to calculate a distribution of positive and negative signs of pixel differences in the sub-areas of the image F[n] and the previous image F[n−1] that are covered by the noise estimator and to output a positive sign number No(+) and a negative sign number No(−).

The confidence generator 140 is connected to the distribution calculator 130 in order to produce a confident level index K and a complementary confident level index 1−K according to the positive sign number No(+) and the negative sign number No(−).

The recursive filter 150 is connected to the noise estimator 120 and the confidence generator 140 in order to perform a recursive filtering operation on the noise estimation index noise_index according to the confident level index K and to produce a noise estimate noise_measurement for the image.

Figure 2:
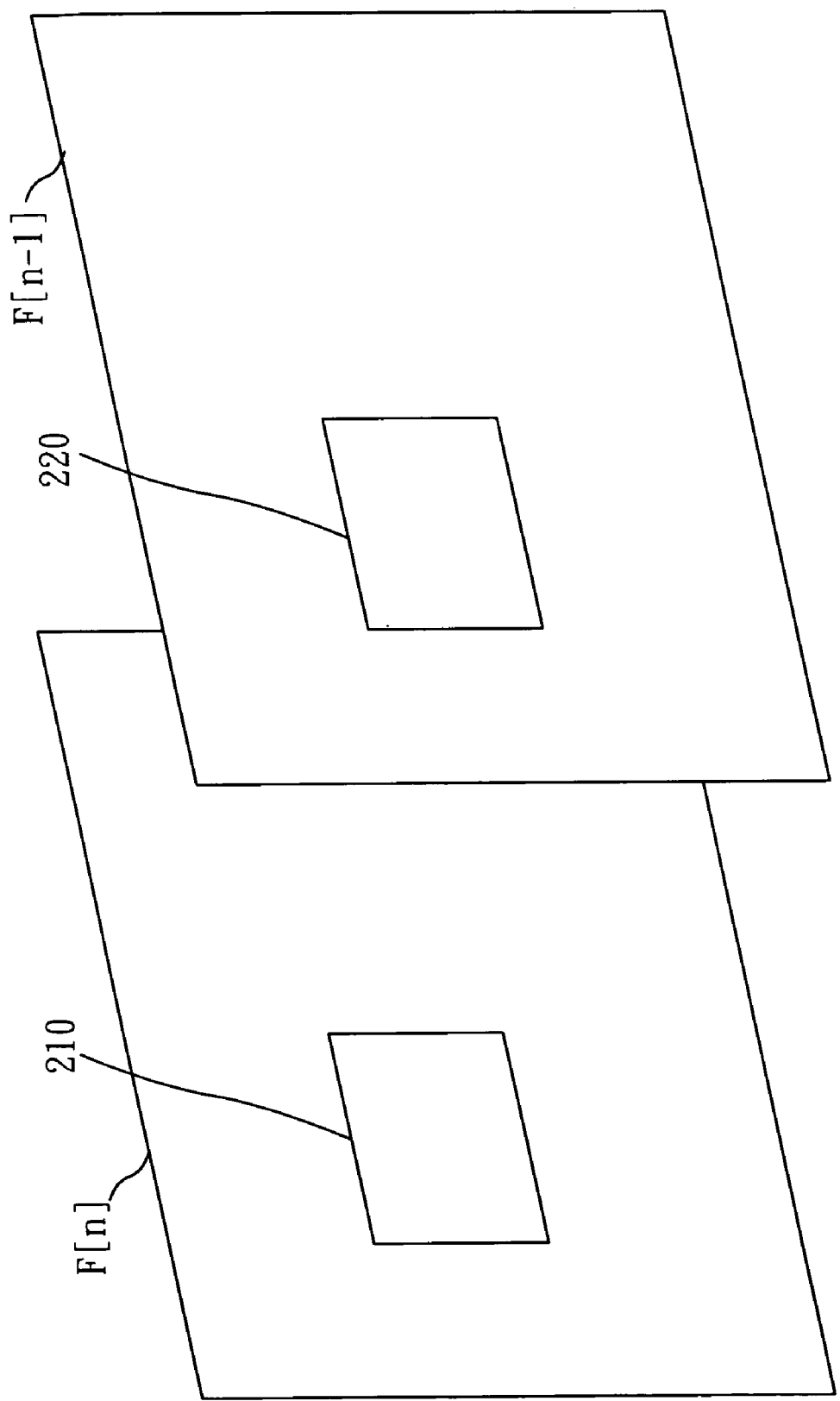
FIG. 2 is a schematic diagram of a corresponding area in an image F[n] and an previous image F[n−1] according to the invention.

FIG. 2 is a schematic diagram of a corresponding area in an image F[n] and an previous image F[n−1] according to the invention. The noise estimator 120 performs a noise estimation on a sub-area 210 of the image F[n] and a sub-area 220 of the previous image F[n−1] and produces a noise estimation index noise_index for the sub-area 210. In this embodiment, the sub-area 210 is a part of the image F[n] for convenient description, but not limited to it. In other embodiments, the sub-area 210 can be expanded to cover full area of the image F[n]. The noise estimation index noise_index is expressed as:

$$\sum_{i,j} |P_N(i, j) - P_{N-1}(i, j)|,$$

where i, j indicate the sub-areas 210, 220 covered by the noise estimator 120, $P_N(i,j)$ indicates a pixel of the image F[n] that locates in the sub-area 210 covered by the noise estimator 120, and $P_{N-1}(i,j)$ indicates a pixel of the previous image F[n−1] that locates in the sub-area 220 covered by the noise estimator 120.

Figure 3:
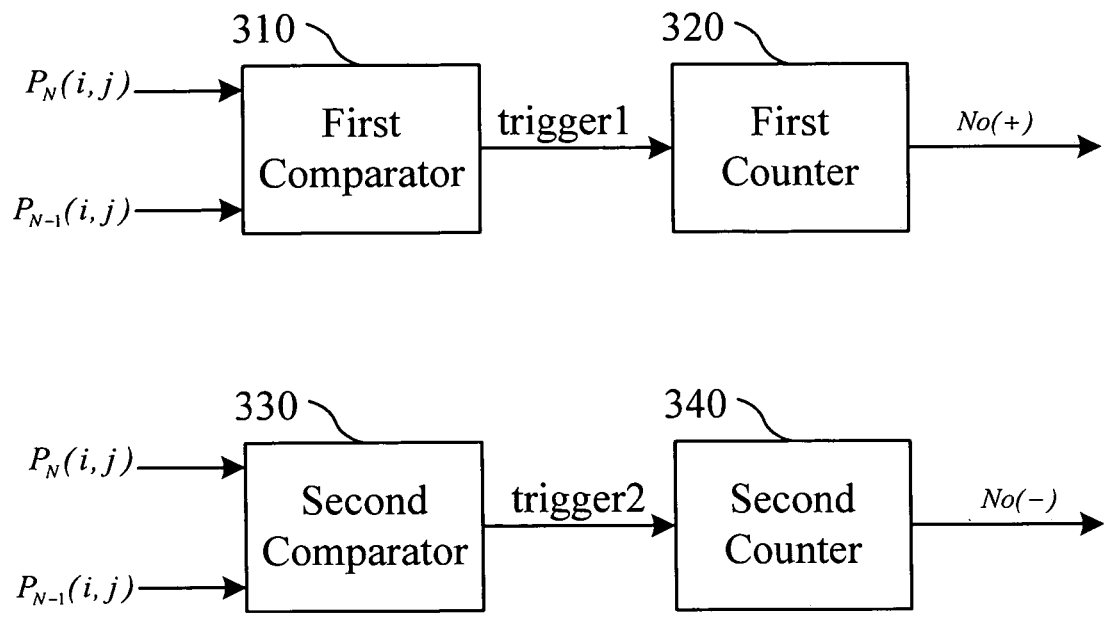
FIG. 3 is a block diagram of a distribution calculator according to the invention.

FIG. 3 is a block diagram of the distribution calculator 130 according to the invention. The distribution calculator 130 includes a first comparator 310, a first counter 320, a second comparator 330 and a second counter 340.

The first comparator 310 has a first input terminal to receive the pixel, $P_N(i,j)$ and a second input terminal to receive the pixel $P_{N-1}(i,j)$. When the pixel $P_N(i,j)$ is greater than the pixel $P_{N-1}(i,j)$, a first trigger signal trigger_1 is produced. The first counter 320 is connected to the first comparator 310 in order to count according to the first trigger signal trigger_1 and find the positive sign number No(+).

The second comparator 330 has a first input terminal to receive the pixel $P_N(i,j)$ and a second input terminal to receive the pixel $P_{N-1}(i,j)$. When the pixel $P_N(i,j)$ is smaller than the pixel $P_{N-1}(i,j)$, a second trigger signal trigger_2 is produced. The second counter 340 is connected to the second comparator 330 in order to count according to the second trigger signal trigger_2 and find the negative sign number No(−).

The confidence generator 140 produces the confident level index K which can be expressed as:

1−{|No(+)−No(−)|/total_no}, where No(+) indicates the positive sign number, No(−) indicates the negative sign number, and total_no indicates a total number of pixels of the sub-area 210 covered by the noise estimator 120. The confidence generator further produces a complementary confident level index 1−K which can be expressed as:

|No(+)−No(−)|/total_no.

Figure 4:
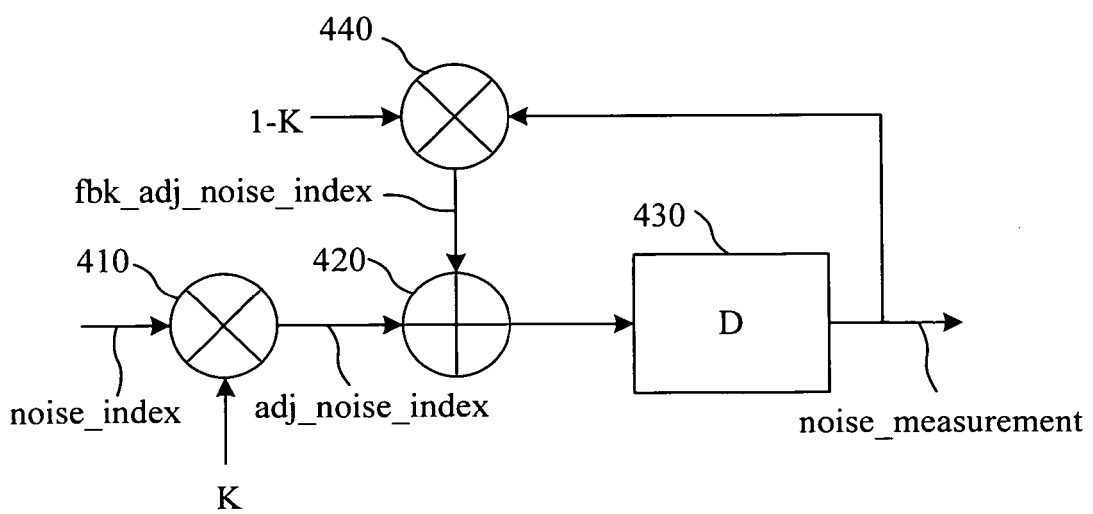
FIG. 4 is a block diagram of a recursive filter according to the invention.

FIG. 4 is a block diagram of the recursive filter 150 according to the invention. The recursive filter 150 includes a first multiplier 410, an adder 420, a register and a second multiplier 440.

The first multiplier 410 connected to the confidence generator 140 and the noise estimator 120 has a first input terminal to receive the noise estimation index noise_index and a second input terminal to receive the confident level index K to accordingly multiply the index noise_index by the confident level index K and produce an adjustment noise index adj_noise_index.

The adder 420 connected to the first multiplier 410 has a first input terminal to receive the adjustment noise index adj_noise_index and a second input terminal to receive a feedback adjustment estimate fbk_adj_noise_index.

The register 430 is connected to the adder 420 in order to register the output of the adder 420 and to produce the noise estimate noise_measurement.

The second multiplier 440 connected to the confidence generator 140 and the register 430 has a first input terminal to receive the complementary confident level index 1−K and a second input terminal to receive the noise estimate noise_measurement to accordingly multiply the noise estimate noise_measurement by the complementary confident level index 1−K and to produce the feedback adjustment estimate fbk_adj_noise_index.

As cited, the invention sums the absolute differences in the predetermined sub-areas 210, 220 (such as 32×32 pixels) of the current image F[n] and the previous image F[n−1] to thereby obtain the noise estimation index noise_index. The pixel differences in the predetermined sub-areas 210, 220 are analyzed to find the positive and negative sign numbers No(+) and No(−) of the pixel differences. In general, the noise distribution is a normalized distribution with a mean of zero, and in this case the numbers No(+) and No(−) are approximately equal. When the image is affected by a motion, the difference between the numbers No(+) and No(−) is enlarged, and a confident level index K is produced after the distribution of the positive and negative signs is analyzed. The confident level index K is applied to control the response of the recursive filter 150. The proportion of a noise estimation index noise_index initially obtained for the image F[n] is increased when a high K is obtained, and conversely the proportion is decreased to avoid the measured noise level from the interference. Accordingly, a reliable noise estimate noise_measurement can be obtained.

The prior art requires determining a threshold to separate the noise-based difference from the motion-based difference. The invention can eliminate the threshold setting and reflect a noise level in a time interval by analyzing the difference distribution, producing the confident level index K and dynamically adjusting the parameters of the recursive filter.

The noise estimation index in the invention can be produced after a spatially filtering operation, without limiting to the sum of temporal absolute differences. A spatial noise estimate can be obtained by analyzing the confident level of a spatial noise distribution (the possibility of a noise or signal) and dynamically adjusting the recursive filter. The operation range can be divided into a plurality of blocks for the respective calculation, not limited to a spatially continuous image.

Although the present invention has been explained in relation to its preferred embodiment, it is to be understood that many other possible modifications and variations can be made without departing from the spirit and scope of the invention as hereinafter claimed.

What is claimed is:

1. An image noise measurement system, which performs a noise estimation on an image, comprising:
a storage device, storing a previous image prior to the image;
a noise estimator, connected to the storage device, for performing a noise estimation on sub-areas of the image and the previous image and producing a noise estimation index for the sub-area of the image;
a distribution calculator, connected to the noise estimator, for calculating a distribution of positive and negative signs of pixel differences in the sub-areas of the image and the previous image that are covered by the noise estimator and outputting a positive sign number and a negative sign number;
a confidence generator, connected to the distribution calculator, for producing a confident level index according to the positive sign number and the negative sign number; and
a recursive filter, connected to the noise estimator and the confidence generator, for performing a recursive filtering operation on the noise estimation index according to the confident level index so as to produce a noise estimate for the image;
wherein the noise estimation index is expressed as:

$$\sum_{i,j} |P_N(i,j) - P_{N-1}(i,j)|,$$

wherein i, j indicated the sub-areas covered by the noise estimator respectively, $P_N(i,j)$ indicates a pixel of the sub-area of the image covered by the noise estimator, and $P_{N-1}(i,j)$ indicates a pixel of the sub-area of the previous image covered by the noise estimator; and
wherein the distribution calculator comprises:
a first comparator, having a first input terminal to receive the pixel $P_N(i,j)$ and a second input terminal to receive the pixel $P_{N-1}(i,j)$ and producing a first trigger signal when the pixel $P_N(i,j)$ is greater than the pixel $P_{N-1}(i,j)$; and
a first counter, connected to the first comparator for counting the positive sign number according to the first trigger signal.

2. The system as claimed in claim 1, wherein the distribution calculator further comprises:
a second comparator, having a first input terminal to receive the pixel $P_N(i,j)$ and a second input terminal to receive the pixel $P_{N-1}(i,j)$ and producing a second trigger signal when the pixel $P_N(i,j)$ is smaller than the pixel $P_{N-1}(i,j)$; and
a second counter, connected to the second comparator for counting the negative sign number according to the second trigger signal.

3. The system as claimed in claim 2, wherein the confident level index produced by the confidence generator is expressed as:

$$1 - \{|No(+) - No(-)|/total\_no\},$$

wherein No(+) indicates the positive sign number, No(−) indicates the negative sign number, and total_no indicates a total number of pixels of one sub-area covered by the noise estimator.

4. The system as claimed in claim 3, wherein the confidence generator further produces a complementary confident level index which is expressed as:

$$|No(+) - No(-)|/total\_no,$$

wherein No(+) indicates the positive sign number, No(−) indicates the negative sign number, and total_no indicates the total number of pixels of the one sub-area covered by the noise estimator.

5. The system as claimed in claim 4, wherein the recursive filter comprises:
a first multiplier, connected to the confidence generator and the noise estimator, having a first input terminal to receive the noise estimation index and a second input terminal to receive the confident level index to accordingly multiply the noise estimation index by the confident level index so as to produce an adjustment noise index;
an adder, connected to the first multiplier, having a first input terminal to receive the adjustment noise index and a second input terminal to receive a feedback adjustment estimate;
a register, connected to the adder for registering an output of the adder and producing the noise estimate; and a second multiplier, connected to the confidence generator and the register, having a first input terminal to receive the complementary confident level index and a second input terminal to receive the noise estimate to accordingly multiply the noise estimate by the complementary confident level index so as to produce the feedback adjustment estimate.

6. A method of measuring an image noise, which performs a noise estimation on an image, the method comprising:

storing a previous image immediately prior to the image;

performing a noise estimation on sub-areas of the image and the previous image and producing a noise estimation index for the sub-area of the image;

calculating a distribution of positive and negative signs of pixel differences in the sub-areas of the image and the previous image and outputting a positive sign number and a negative sign number;

producing a confident level index according to the positive sign number and the negative sign number; and performing a recursive filtering operation on the noise estimation index according to the confident level index so as to produce a noise estimate for the image;

wherein the noise estimation index is expressed as:

$$\sum_{i,j} |P_N(i, j) - P_{N-1}(i, j)|,$$

wherein i, j indicated the sub-areas covered by the noise estimator respectively, $P_N(i,j)$ indicates a pixel of the sub-area of the image covered by the noise estimator, and $P_{N-1}(i,j)$ indicates a pixel of the sub-area of the previous image covered by the noise estimator; and wherein the step of calculating a distribution of positive and negative signs of pixel differences comprises:

produces a first trigger signal when the pixel $P_N(i,j)$ is greater than pixel $P_{N-1}(i,j)$; and counting the positive sign number according to the first trigger signal.

7. The method as claimed in claim 6, further comprising:

producing a second trigger signal when the pixel $P_N(i,j)$ is smaller than the pixel $P_{N-1}(i,j)$; and counting the negative sign number according to the second trigger signal.

8. The method as claimed in claim 7, wherein the confident level index is expressed as:

1−{|No(+)−No(−)|/total_no}, wherein No(+) indicates the positive sign number, No(−) indicates the negative sign number, and total_no indicates a total number of pixels of the sub-area of the image covered by the noise estimator.

9. The method as claimed in claim 8, wherein the step of producing a confident level index further produces a complementary confident level index which is expressed as:

|No(+)−No(−)|/total_no, wherein No(+) indicates the positive sign number, No(−) indicates the negative sign number, and total_no indicates the total number of pixels of the sub-area of the image covered by the noise estimator.

10. The method as claimed in claim 9, wherein the step of performing a recursive filtering operation comprises:

receiving the noise estimation index and the confident level index so as to multiply the noise estimation index and the confident level index to produce an adjustment noise index;

receiving the adjustment noise index and a feedback adjustment estimate and producing an output;

registering the output and producing the noise estimate; and receiving the complementary confident level index and the noise estimate so as to multiply the noise estimation index and the confident level index to produce the feedback adjustment estimate.

* * * * *